(No Model.) 2 Sheets—Sheet 1.
L. B. CURTIS.
PIPE CUTTING AND THREADING MACHINE.

No. 559,791. Patented May 12, 1896.

WITNESSES
H. A. Sauls
S. V. Richardson

INVENTOR
Lewis B. Curtis
By A. M. Wooster
Atty.

(No Model.) 2 Sheets—Sheet 2.
L. B. CURTIS.
PIPE CUTTING AND THREADING MACHINE.
No. 559,791. Patented May 12, 1896.
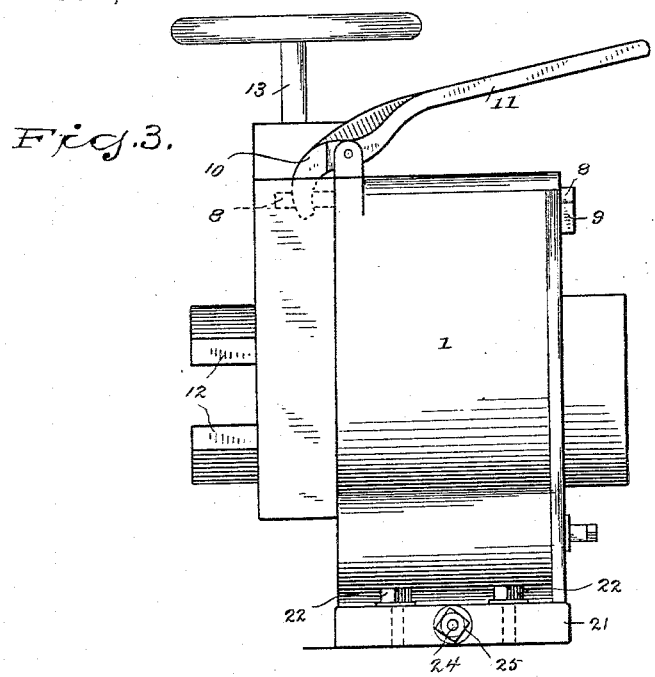
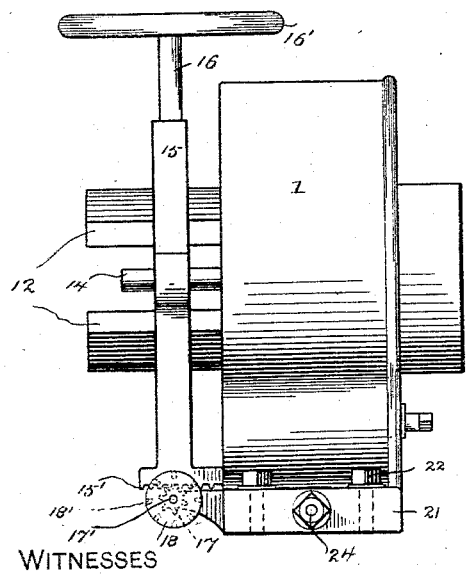
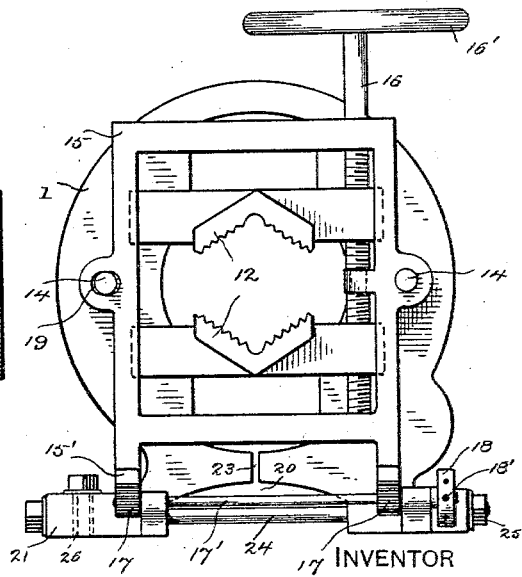
WITNESSES
H. H. Lamb
S. V. Richardson
INVENTOR
Lewis B. Curtis
By A. M. Wooster
Atty.

UNITED STATES PATENT OFFICE.

LEWIS B. CURTIS, OF SOUTHPORT, CONNECTICUT, ASSIGNOR TO CURTIS & CURTIS, OF BRIDGEPORT, CONNECTICUT.

PIPE CUTTING AND THREADING MACHINE.

SPECIFICATION forming part of Letters Patent No. 559,791, dated May 12, 1896.

Application filed January 27, 1896. Serial No. 576,964. (No model.)

*To all whom it may concern:*

Be it known that I, LEWIS B. CURTIS, a citizen of the United States, residing at Southport, in the county of Fairfield and State of Connecticut, have invented certain new and useful Improvements in Pipe Cutting and Threading Machines; and I do hereby declare the following to be a full, clear, and exact description of the invention, such as will enable others skilled in the art to which it appertains to make and use the same.

This invention relates to machines for cutting and threading pipes or rods, and has particular reference to that class of such machines in which a rotary die-carrying ring is supported in a surrounding casing with the toothed exterior of the ring bearing on the interior of the casing. In such machines the wear of the crowns of the teeth and the bearing-surface of the casing will eventually impair the efficiency of the machine; and the principal object of this invention is the production of a pipe cutting and threading machine of this type which will practically permit of the taking up of the wear at these points.

A further object of the invention is to dispense with the lead blocks and lead screw inside the casing and to feed the pipe or rod being threaded by means of the vise-jaws, thus permitting of reduction in the length of the casing.

To these ends the invention consists in the construction and combination of parts substantially as hereinafter described and claimed.

Figure 1:
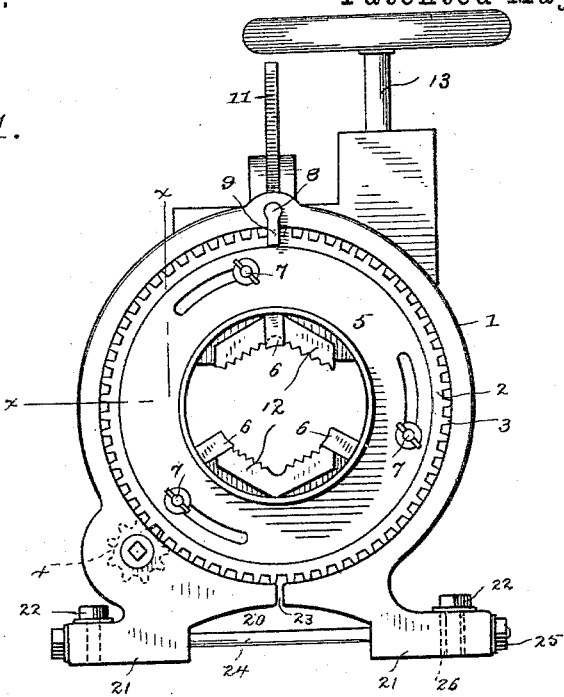
Figure 2:
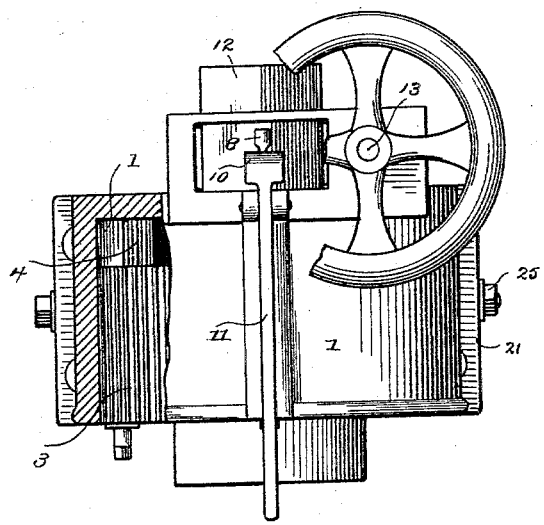

In the drawings which accompany and form part of this specification, Figure 1 represents a front elevation of a machine embodying the invention. Fig. 2 is a plan view, partly broken out, on the line *x x* of Fig. 1. Fig. 3 is a side elevation from the left of Fig. 1. Figs. 4 and 5 are respectively side and rear elevations of a different form of machine embodying certain additional features of invention.

Similar reference-characters are used to designate the same parts in the several views.

1 denotes the casing, and 2 the die-carrying ring, having circumferential teeth 3 engaged by the pinion 4, which is journaled in the casing and is rotated by a suitable crank (not shown) and revolves the said ring, the teeth 3 of which bear on the inner surface of the casing.

The machine illustrated in Figs. 1, 2, and 3 is of the general type described and claimed in United States Patent No. 443,500, granted December 30, 1890. In said figures the construction shown is one in which a cam-plate 5 is rotatively adjusted on the ring 2 to adjust the dies 6 inward or outward, said cam-plate being secured to the ring 2 in its adjusted position by thumb-nuts 7.

8 denotes a rod mounted to slide freely in the rim of the casing and having a finger 9 at one end extending inward over the edge of the ring 2, and having an opening at the other end to receive the cam-shaped portion 10 of the lever 11, fulcrumed on the casing, whereby the die-ring may be moved rearward, substantially as shown and for the purpose described in the aforesaid patent.

12 denotes the vise-jaws, and 13 the operating-screw therefor, the details of which are well understood by those skilled in the art.

Referring to Figs. 4 and 5, 14 denotes two guide-rods projecting at the rear of the casing and entering guide-openings in a rectangular frame 15, in which the vise-jaws 12 are adapted to slide and be moved toward and from each other by a right and left hand threaded rod 16, having hand-wheel 16'. The lower end of the frame 15 is provided with horizontal rack-bars 15', which are engaged by pinions 17 on a shaft 17', mounted in bearings at the base of the casing, and having a wheel 18 at one end, by means of which the shaft and pinions can be rotated to feed the frame 15 and the vise-jaws 12 toward and from the rear of the casing. The wheel 18 is provided with holes 18' to receive a hand-lever. The opening in the frame 15 for one of the rods 14 is elongated to form a slot, as at 19, for a purpose presently explained. In this construction the feed of the work to be operated upon is obtained by the horizontal movement of the vise-jaws by rotating the pinion-shaft 17'.

In both forms of threaders shown the casing is recessed at the under side, as at 20, between the lugs or feet 21, by means of which and bolts 22 the device is secured to a suitable bench or support. At or about the center of this recess the casing is divided from edge to edge, as at 23, and a screw-bolt 24 extends horizontally through the feet and across the recess 20, said screw-bolt having a nut and a head or two nuts, as at 25, by means of which the feet can be drawn toward each other to reduce the width of the split 23, and thereby take up the wear of the casing 1 and ring-teeth 3. In one or both of the feet 21 the holes through which the bolts 22 pass are elongated to form slots 26, the purpose being to enable the casing to be contracted, as just described, without disturbing the attaching-bolts by which the machine is secured to its support.

In the construction shown in Fig. 5 the movement of the feet toward each other would also draw the guide-rods 14 somewhat in the same direction. To prevent the frame 15 from then binding, one of the openings for the guide-rods is elongated, as at 19.

Machines of this type have been constructed with an opening or slit in the casing near its upper portion and with a lug at each side of said slit or opening, through which a tightening-bolt passes. It thus requires a special construction, since the casing of an old form of threader, which has no opening or lugs, does not contain stock enough to permit the riveting of lugs thereto. Such old machines, having no means of adjustment, may be so altered or reconstructed in accordance with this present invention as to give them all the advantages possessed by the machines before mentioned having lugs and adjusting-bolts.

Having now described the invention, what I claim is—

1. A pipe-threader comprising in its construction a die-carrying ring, a casing therefor having attaching-feet and divided from edge to edge between said feet, and means for adjustably securing said feet to a bench or support.

2. The combination with the die-carrying ring 2, of the casing 1 having attaching-feet 21 the bolt-holes of one of which are slotted, the said casing being divided or split from edge to edge between said feet, and the screw-bolt 24 passing horizontally through the feet.

3. The combination with a casing divided or split from edge to edge, substantially as shown and having the guide-rods 14, of the rectangular frame 15 having openings for the rods 14, one of said openings being elongated, said frame also having racks 15' and carrying adjustable vise-jaws, and the shaft 17' having pinions 17 meshing with said racks.

4. The combination with the casing 1 having the guide-rods 14 and the feet 21 and split between said feet, of the rectangular frame 15 having racks 15' and carrying the vise-jaws, the shaft 17' having pinions 17 meshing with said racks, and the screw-bolt 24 passing horizontally through the feet, the opening in the frame 15 for one of the rods 14 being elongated substantially as and for the purpose described.

5. A pipe cutting and threading machine having a die-carrying ring, a casing having attaching-feet and divided or split between said feet and means for drawing said feet together.

In testimony whereof I affix my signature in presence of two witnesses.

LEWIS B. CURTIS.

Witnesses:
A. M. WOOSTER,
S. V. RICHARDSON.